(12) United States Patent
Caveney

(10) Patent No.: US 11,884,206 B2
(45) Date of Patent: Jan. 30, 2024

(54) COLLABORATIVE SUPPORT FOR OBSTRUCTED LINE OF SIGHT SCENARIOS

(71) Applicant: TOYOTA MOTOR ENGINEERING & MANUFACTURING NORTH AMERICA, INC., Plano, TX (US)

(72) Inventor: Derek S. Caveney, Plymouth, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 151 days.

(21) Appl. No.: 17/467,150

(22) Filed: Sep. 3, 2021

(65) Prior Publication Data
US 2023/0073966 A1    Mar. 9, 2023

(51) Int. Cl.
| | |
|---|---|
| *B60Q 1/00* | (2006.01) |
| *B60Q 1/50* | (2006.01) |
| *B60W 30/095* | (2012.01) |
| *B60Q 5/00* | (2006.01) |
| *H04W 4/46* | (2018.01) |
| *B60W 40/04* | (2006.01) |

(52) U.S. Cl.
CPC .......... *B60Q 1/525* (2013.01); *B60Q 5/006* (2013.01); *B60W 30/0956* (2013.01); *B60W 40/04* (2013.01); *H04W 4/46* (2018.02); *B60W 2554/4041* (2020.02); *B60W 2554/80* (2020.02); *B60W 2556/45* (2020.02)

(58) Field of Classification Search
CPC ... B60Q 1/525; B60Q 5/006; B60W 30/0956; B60W 40/04; B60W 2554/4041; B60W 2554/80; B60W 2556/45; B60W 2554/00; B60W 2554/4042; B60W 2554/4044; B60W 50/0097; H04W 4/46; G08G 1/16
See application file for complete search history.

(56) References Cited

U.S. PATENT DOCUMENTS

| | | | |
|---|---|---|---|
| 9,604,641 B2 * | 3/2017 | Al-Stouhi | ............ B60W 10/04 |
| 9,810,783 B2 * | 11/2017 | Fligler | ................. G08G 1/054 |
| 10,410,525 B2 | 9/2019 | Mohra | |
| 10,614,709 B2 | 4/2020 | Vozar | |

(Continued)

FOREIGN PATENT DOCUMENTS

| | | |
|---|---|---|
| CN | 110047300 | 7/2019 |
| CN | 110390826 B | 11/2020 |
| WO | 2018030390 | 2/2018 |

OTHER PUBLICATIONS

Hiawatha Bray, "Teaching a driverless car to turn left," The Boston Globe, Apr. 2017.

*Primary Examiner* — Toan N Pham
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods of collision detection are provided which combine the concept of collaborative support with common/existing in-vehicle imaging and proximity sensor technologies. In particular, an "intermediary" vehicle may signal one or more objects (e.g. other vehicles, pedestrians, etc.) which are within the line of sight of the intermediary vehicle (and thus its imaging and proximity sensors), but not within the line of sight of each other, to a potential collision between the two objects.

20 Claims, 8 Drawing Sheets

(56) References Cited

U.S. PATENT DOCUMENTS

| | | | |
|---|---|---|---|
| 2007/0054685 A1* | 3/2007 | Kellum | G08G 1/166 455/345 |
| 2012/0068859 A1* | 3/2012 | Mochizuki | G08G 1/163 340/903 |
| 2020/0055452 A1 | 2/2020 | Yeo | |

* cited by examiner

COLLABORATIVE SUPPORT FOR OBSTRUCTED LINE OF SIGHT SCENARIOS

TECHNICAL FIELD

The present disclosure relates generally to automotive systems and technologies, and more particularly, some embodiments relate to pre-collision safety awareness.

DESCRIPTION OF RELATED ART

Some current collision detection systems utilize in-vehicle imaging sensors (e.g. cameras) and proximity sensors (e.g. radar, sonar, lidar, etc.) in order to track the movement and location of objects (e.g. other vehicles, pedestrians, animals, debris on the road, etc.). For example, many current vehicles are equipped with Blind Spot Monitoring (BSM) systems which use imaging and proximity sensors to detect objects behind the equipped vehicle. Similarly, many vehicles are equipped with Forward Collision Warning (FCW) systems which use imaging and proximity sensors to detect objects in the equipped vehicle's forward path. Certain vehicles may also be equipped with Cross-Traffic Collision Warning Systems which use imaging and proximity sensors to detect objects traveling to either side of the vehicle.

Other collision detection systems use wireless vehicle-to-vehicle (V2V) communications or wireless infrastructure-to-vehicle (I2V) communications (collectively V2X communication) in order send and receive information related to the movement and location of objects. For example, a first V2X equipped vehicle may communicate its movement/location to a second V2X equipped vehicle. In another example, infrastructure-based imaging and proximity sensors at an intersection may detect vehicles and infrastructure, and broadcast their movement/location to V2X equipped vehicles.

BRIEF SUMMARY OF THE DISCLOSURE

According to various embodiments of the disclosed technology, a method for collision detection is provided. The method, in accordance with embodiments of the technology disclosed herein comprises: (1) receiving, by an electronic control unit (ECU) in an intermediary vehicle, a first traffic-related data associated with a first object and a second traffic-related data associated with a second object, wherein the first and second object are within the line of sight of the intermediary vehicle, but not within the line of sight of each other; (2) based in part on the first and second traffic-related data, determining, by the ECU, a probability that the first and second object will collide with each other; and (3) based on the probability of collision, providing, by the ECU, a signal to at least one of the first and second objects. In some embodiments, the first traffic-related data may be received from one or more sensors of a Blind Spot Monitoring system in the intermediary vehicle, and the second traffic-related data may be received from one or more sensors of a Forward Collision Warning and/or a Cross-Traffic Collision Warning system in the intermediary vehicle. In certain embodiments, the first traffic-related data may comprise the speed, heading, acceleration, and location of the first object, and the second traffic-related data may comprise the speed, heading, acceleration, and location of the second object.

In various embodiments, another method for collision detection is provided. The method, in accordance with embodiments of the technology disclosed herein comprises: (1) receiving, by an ECU in an intermediary vehicle, a first traffic-related data associated with a first vehicle approaching an intersection and a second traffic-related data associated with a second vehicle approaching the intersection in a contrary direction to the first vehicle, wherein the first and the second vehicle are within the line of sight of the intermediary vehicle, but not within the line of sight of each other; (2) based on the first and second traffic-related data, determining, by the ECU, that the second vehicle is beginning to turn across the path of the first vehicle; and (3) in response to the determination, signaling, by the ECU, the second vehicle to the approach of the first vehicle. In some embodiments, the first traffic-related data may be received from one or more sensors of a Blind Spot Monitoring system in the intermediary vehicle and the second traffic-related data may be received from one or more sensors of at least one of a Forward Collision Warning and a Cross-Traffic Collision Warning system in the intermediary vehicle. In certain embodiments, signaling the second vehicle to the approach of the first vehicle may comprise operation of lights on the intermediary vehicle.

In some embodiments, a vehicle system is provided. The vehicle system, in accordance with embodiments of the technology disclosed herein comprises: (1) a Blind Spot Monitoring System; (2) at least one of a Forward Collision Warning system and a Cross-Traffic Collision Warning system; and (3) an ECU including machine executable instructions in non-transitory memory to: (a) receive, from the Blind Spot Monitoring System, a first traffic-related data associated with a first object; (b) receive, from at least one of the Forward Collision Warning system and the Cross-Traffic Collision Warning system, a second traffic-related data associated with a second object; (c) based in part on the first and second traffic-related data, determine a probability that the first and second object will collide with each other; and (d) based on the probability of collision, provide a signal to at least one of the first and second objects.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
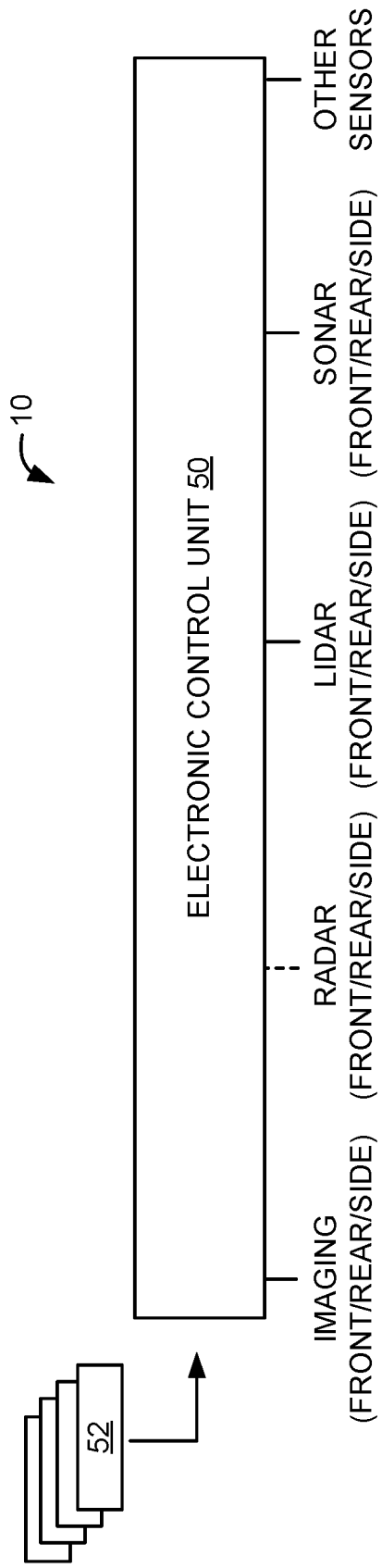
FIG. 1 is a schematic representation of example vehicle having an electronic control unit and sensors.

The figures are not exhaustive and do not limit the present disclosure to the precise form disclosed.

DETAILED DESCRIPTION

As alluded to above, some collision detection systems utilize in-vehicle imaging and proximity sensors in order to track the movement/location of objects such as other vehicles and pedestrians. However, these technologies are limited when an oncoming vehicle or pedestrian is not within the line of sight of the imaging/proximity sensors. For example, in a common left-turn across path (LTAP) scenario, a clear view of oncoming traffic is often obstructed for a vehicle beginning to make a left turn at a multi-lane intersection (see FIG. 3). Accordingly, collision detection systems which rely solely on in-vehicle imaging and proximity sensors have trouble detecting oncoming traffic in these situations.

Collision detection systems which use V2X communication avoid this obstructed line of sight problem by using wireless communication which does not require that communicating vehicles and/or infrastructure are within the line of sight of each other. However, the effectiveness of V2X based collision detection systems is limited when unequipped objects and/or intersections are involved in a collision scenario. Accordingly, because V2X equipped vehicles have not penetrated global markets at a large scale, collision detection systems which rely solely on V2X communication are not yet viable in many markets.

Against this backdrop, embodiments of the technology disclosed herein are directed towards systems and methods of collision detection which overcome the limitations of the current technologies by combining the concept of collaborative support with common/existing in-vehicle imaging and proximity sensor technologies. Specifically, in embodiments of the presently disclosed technology, an "intermediary" vehicle may provide a signal to at least one of two objects (e.g. other vehicles, pedestrians, etc.) which are within the line of sight of the intermediary vehicle (and thus its imaging and proximity sensors), but not within the line of sight of each other. For example, in some embodiments, an ECU in a first vehicle (i.e. "the intermediary") may use its imaging/proximity sensors to detect/determine that a second and third vehicle—which are in the line of sight of the first vehicle, but not each other—are likely to collide. Accordingly, the intermediary may provide a warning signal to at least one of the second and third vehicles. For example, the intermediary may flash its lights and/or activate its horn. In some embodiments, the intermediary may also communicate to either or both vehicles using V2X communication.

As will be described in greater detail in conjunction with FIG. 3, embodiments of the disclosed technology may be implemented in the common LTAP scenario alluded to above. For example, the intermediary may be the ECU of vehicle 302, which is waiting to make a left-turn at the north side of an intersection. Using the Blind Spot Monitoring sensors of vehicle 302, the intermediary may detect that vehicle 304 is quickly approaching the intersection from the north (i.e. heading south). At the same time, using the Forward Collision Warning and/or Cross-Traffic Collision Warning sensors of vehicle 302, the intermediary may detect that vehicle 306, which is approaching the intersection from the south (i.e. heading north), is beginning to make a left-turn across vehicle 304's predicted path. In this common LTAP scenario, the line of sight between vehicles 304 and 306 will be obstructed. However, because both vehicles are within the line of sight of vehicle 302, the intermediary may (1) detect/determine that vehicle 306 is beginning to turn across the path of vehicle 304, and (2) signal vehicle 306 to vehicle 304's approach, by for example, flashing the high beams of vehicle 302. In this way, the concept of collaborative support may be combined with common/existing imaging and proximity sensor technologies to heighten awareness and safety at intersections.

It should be understood that the systems and methods disclosed herein may be implemented with any of a number of different vehicles and vehicle types. For example, the systems and methods disclosed herein may be used with automobiles, trucks, motorcycles, recreational vehicles and other like on or off-road vehicles. In addition, the principals disclosed herein may also extend to hybrid vehicles, gasoline- or diesel-powered vehicles, fuel-cell vehicles, electric vehicles, or other vehicles.

FIG. 1 illustrates an example vehicle (vehicle 10) having an electronic control unit 50 and sensors 52.

Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, a collaborative support module, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors 52 included in vehicle 10. As alluded to above, sensors 52 may be included to detect conditions external to vehicle 10. For example, sensors 52 may include imaging sensors (such as cameras), and proximity sensors (such as radar, lidar, and sonar) which may be used to detect the movement/location of vehicles and pedestrians in the proximity of vehicle 10. As examples, these imaging and proximity sensors may detect and/or compute the speed, acceleration, heading, and location of the other vehicles and pedestrians. These sensors may also detect the operation of turn signals in other vehicles, the phase of traffic lights (i.e. green, yellow, red), traffic signs indicating a current speed limit, road curvature, road grade, obstacles, and so on. As will be described in greater detail below, electronic control unit 50 may use information obtained from these sensors to determine a probability of a collision between two objects and/or determine that one vehicle is beginning to turn across the path of a second vehicle. Finally, as alluded to above, in some embodiments, the imaging and proximity sensors described above may be part of a Blind Spot Monitoring (BSM) system, a Forward Collision Warning (FCW) system, a Cross-Traffic Collision Warning system, or any combination of the three systems.

As alluded to above, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Figure 2:
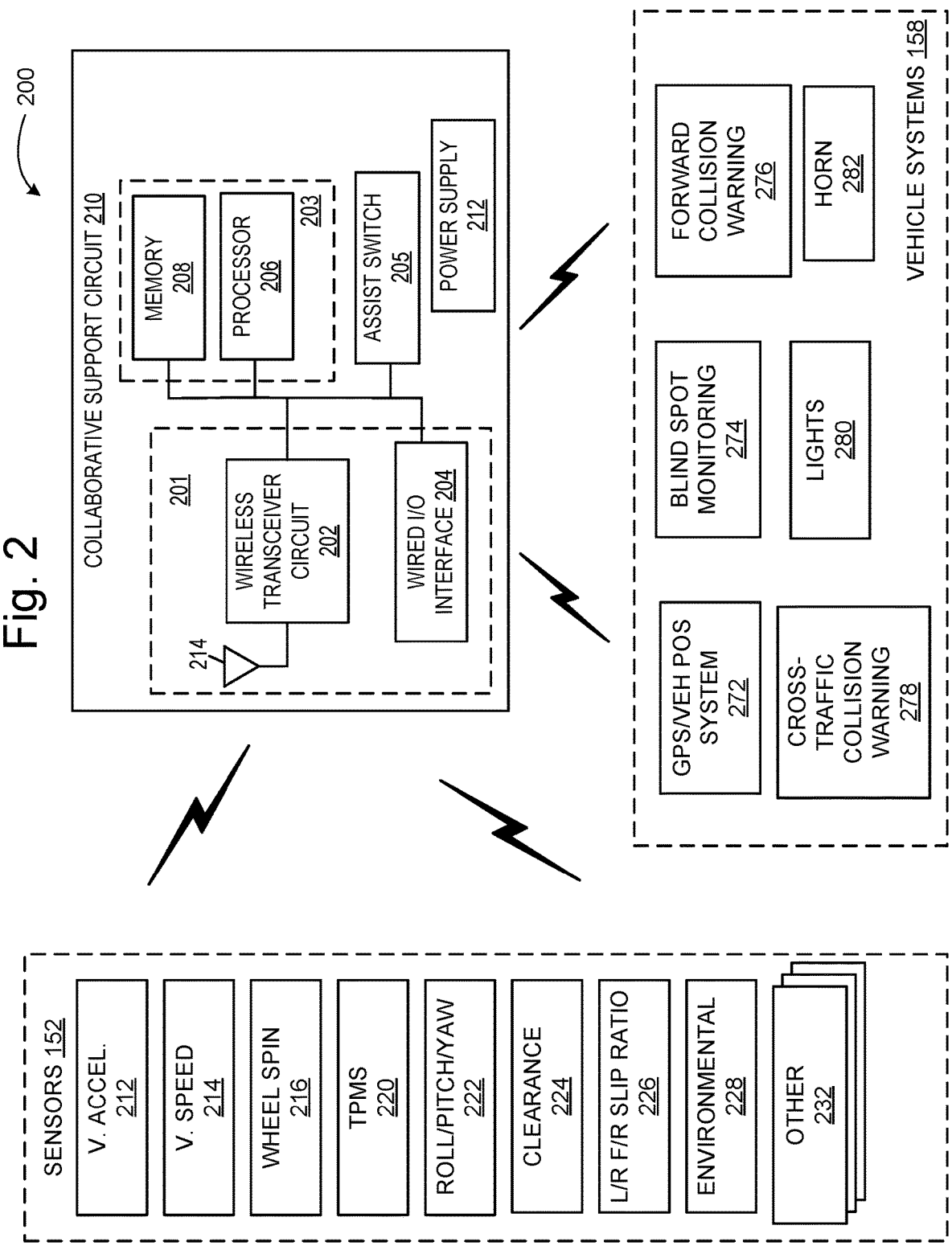
FIG. 2 illustrates an example architecture for (1) detecting/determining a probability that two objects will collide with each other, and (2) providing a warning signal to one or both objects, in accordance with one embodiment of the systems and methods.

FIG. 2 illustrates an example architecture for (1) detecting/determining a probability that two objects will collide with each other, and (2) providing a warning signal to one or both objects, in accordance with one embodiment of the systems and methods described herein. Referring now to FIG. 2, in this example, collaborative support system 200 includes a collaborative support circuit 210, a plurality of sensors 152, and a plurality of vehicle systems 158. Sensors 152 and vehicle systems 158 can communicate with collaborative support circuit 210 via a wired or wireless communication interface. Although sensors 152 and vehicle systems 158 are depicted as communicating with collaborative support circuit 210, they can also communicate with each other as well as with other vehicle systems. Collaborative support circuit 210 can be implemented as an ECU or as part of an ECU such as, for example electronic control unit 50. In other embodiments, collaborative support circuit 210 can be implemented independently of an ECU.

Collaborative support circuit 210 in this example includes a communication circuit 201, a decision circuit (including a processor 206 and memory 208 in this example) and a power supply 212. Components of collaborative support circuit 210 are illustrated as communicating with each other via a data bus, although other communication in interfaces can be included. Collaborative support circuit 210 in this example also includes a manual assist switch 205 that can be operated by the user to manually select the collaborative support mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to collaborative support circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a collaborative support circuit 210.

Communication circuit 201 may include either or both of a wireless transceiver circuit 202 with an associated antenna 214 and a wired I/O interface 204 with an associated hardwired data port (not illustrated). As this example illustrates, communications with collaborative support circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by collaborative support circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

As will be described in greater detail below, in some embodiments collaborative support circuit 210 may use V2X communication to communicate with other vehicles (V2V communications) or roadside units of a vehicle-to-infrastructure (V2I) communications system (both referred to as V2X communications). These communications can be received directly by collaborative support circuit 210, another electronic control unit, or other communications component of vehicle 10 (and forwarded to collaborative support circuit 210 via communication circuit 201).

Power supply 212 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can also include additional sensors that may or not otherwise be included on a standard vehicle 10 with which the turn collaborative support system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions).

Additional sensors 232 can also be included as may be appropriate for a given implementation of collaborative support system 200. For example, as alluded to above, additional sensors 232 may include imaging sensors (such as cameras), and proximity sensors (such as radar, lidar, and sonar) which may be used to detect the movement and/or location of objects, such as vehicles and pedestrians. For example, these imaging and proximity sensors may detect and/or compute the speed, acceleration, heading, and location of other vehicles and pedestrians. These sensors may also detect the operation of turn signals in other vehicles, the phase of traffic lights (i.e. green, yellow, red), traffic signs indicating a current speed limit, road curvature, road grade, obstacles, and so on. As alluded to above, in some embodiments, the imaging and proximity sensors described above may be part of Blind Spot Monitoring system 274, Forward Collision Warning system 276, Cross-Traffic Collision Warning 278, or any combination of the three.

Vehicle systems 158 can include any of a number of different vehicle components or subsystems used to control or monitor various aspects of the vehicle and its performance. In this example, the vehicle systems 158 include a GPS or other vehicle positioning system 272 for detecting the location of vehicle 10 (including in relation to other vehicles and/or objects); Blind Spot Monitoring system 274 for detecting the movement and location of objects behind vehicle 10; Forward Collision Warning system 276 for detecting the movement and location of objects in front of vehicle 10; Cross-Traffic Collision Warning system 278 for detecting the movement and location of objects to the sides of vehicle 10; and light system 280 and horn 282, which may be used to signal vehicles and pedestrians regarding impending collisions.

During operation, collaborative support circuit 210 can receive information from various vehicle sensors to determine whether to provide collaborative support. Communication circuit 201 can be used to transmit and receive information between collaborative support circuit 210 and sensors 152, and collaborative support circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to provide collaborative support. Additionally, communication circuit 201 can be used to send an activation signal or other activation information to various vehicle systems 158 as part of entering collaborative support mode. For example, communication circuit 201 can be used to send control signals to either or both of light system 280 and horn 282 to provide a warning signal to other vehicles and/or pedestrians (e.g. by flashing high beams and honking the horn). In other embodiments, collaborative support circuit 210 may use V2X communication to send an alert/signal to one or more vehicles that collaborative support circuit 210 determines are likely to collide.

As alluded to above, the decision regarding what action to take via these various vehicle systems 158 can be made based on the information detected by sensors 152. Examples of this are described in more detail below.

Figure 3:
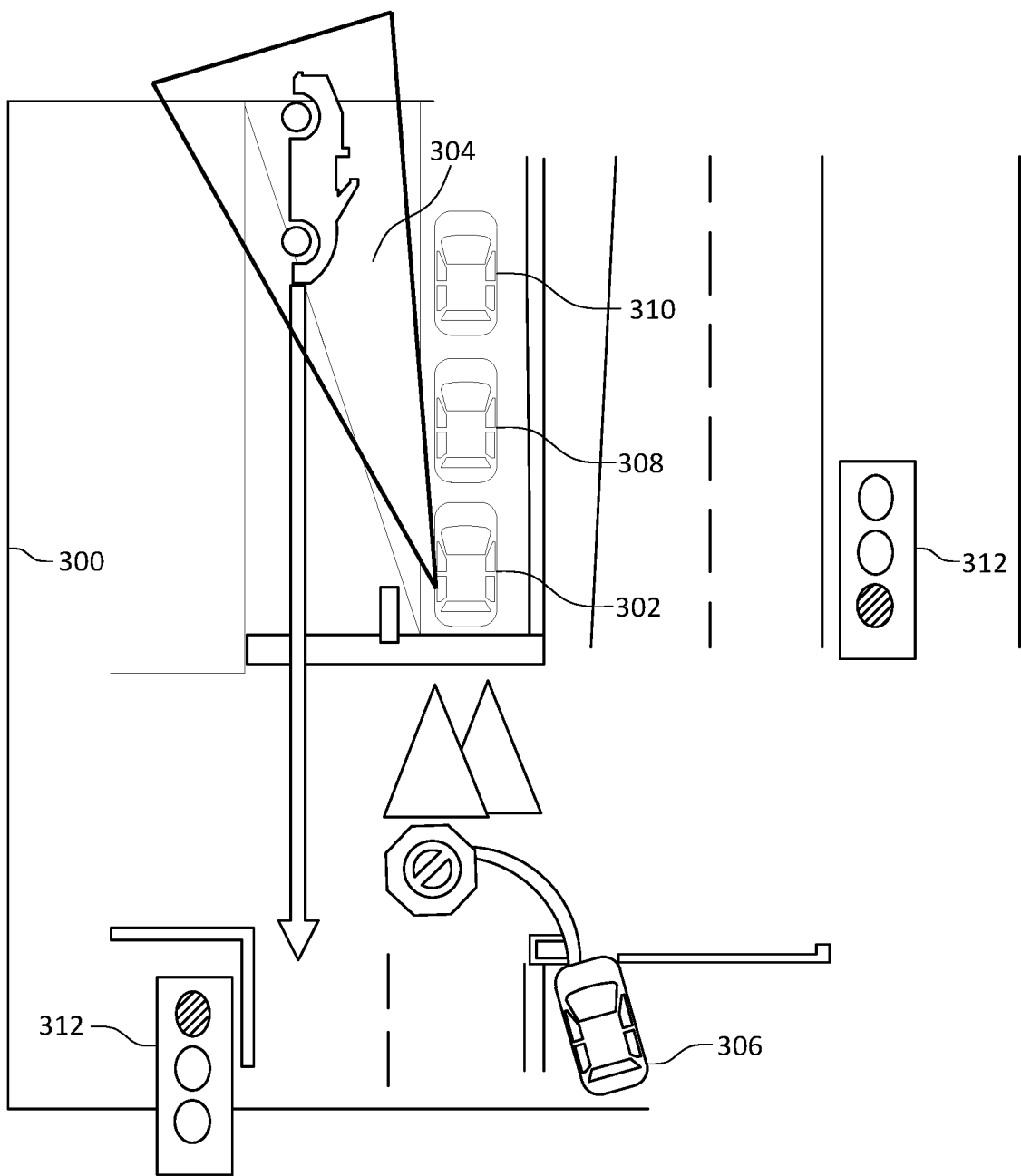
FIG. 3 depicts an example left-turn across path scenario in which embodiments of the disclosed technology may be implemented.

FIG. 3 depicts an example LTAP scenario in which embodiments of the disclosed technology may be implemented. In FIG. 3, vehicle 302 (i.e. the intermediary) is stopped at intersection 300, waiting to make a left-turn (in the east direction). Vehicle 304 is rapidly approaching intersection 300 from the north. Vehicle 306, approaching intersection 300 from the south, is beginning to make a left-turn (in the west direction). Vehicles 308 and 310, which are behind vehicle 302, are also waiting to make left-turns (in the east direction). In FIG. 3, traffic lights 312 are green. Accordingly, vehicle 304 has the right of way at intersection 300, while vehicle 306 may legally make a left-turn when the oncoming direction of traffic is clear.

As illustrated in FIG. 3, vehicles 302, 308, and 310 are obstructing the line of sight between vehicles 306 and 304. For this reason, as vehicle 306 is beginning to turn, neither the driver of vehicle 306, nor any imaging/proximity sensors equipped on vehicle 306, will be able to detect the movement/location of vehicle 304. Accordingly, neither the driver of vehicle 306, nor a collision detection system in vehicle 306 which relies on imaging/proximity sensors, will be able to adequately judge whether it is safe to make a left-turn.

However, as illustrated by FIG. 3, vehicle 302 is within the line of sight of both vehicle 304 and 306. Therefore, imaging/proximity sensors equipped on vehicle 302 may detect (1) the movement/location of vehicle 304 as it approaches the intersection, and (2) the movement/location of vehicle 306 as it begins to turn across vehicle 304's path. In some embodiments, the imaging/proximity sensors which detect the movement/location of vehicle 304 may be part of a Blind Spot Monitoring system, and the imaging/proximity sensors which detect the movement/location of vehicle 306 may be part of a Forward Collision Warning system and/or a Cross-Traffic Collision Warning system.

As will be described in greater detail below, an ECU in vehicle 302 may receive the information obtained by the imaging/proximity sensors of vehicle 302, and determine that vehicle 306 is beginning to turn across vehicle 304's path. Accordingly, the ECU in vehicle 302 may provide a warning signal to either or both of vehicles 304 and 306. For example, the ECU in vehicle 302 may flash the lights of vehicle 302 (e.g. the high beams, brake lights, hazard lights, or a combination of the three) to alert the driver of vehicle 306 to vehicle 304's approach. In some embodiments, the ECU in vehicle 302 may activate the horn of vehicle 302 as a warning signal.

Figure 4:
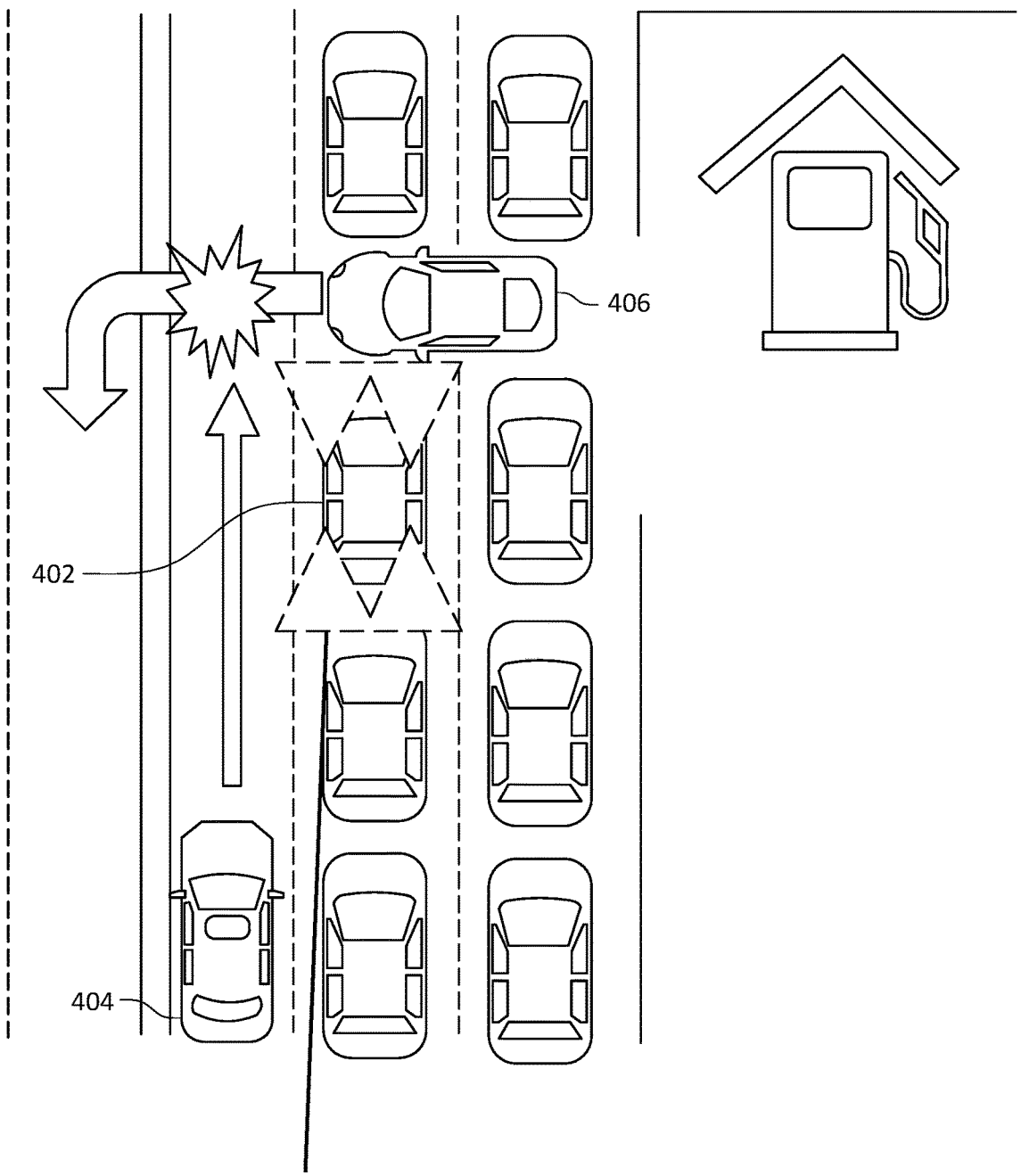
FIG. 4 depicts another example scenario in which embodiments of the disclosed technology may be implemented

FIG. 4 depicts another example scenario (i.e. the Gas Station scenario) in which embodiments of the disclosed technology may be implemented. In FIG. 4, vehicle 402 (i.e. the intermediary) is facing north, but is presently stationary because of a slowdown in traffic. Vehicle 404 is rapidly heading north in an open lane to the left of vehicle 402. Vehicle 406 has recently exited a gas station, and is presently heading west, through a gap in traffic. In the illustrated example, vehicle 406 intends to make a left turn (in the south direction), once it clears the gap in traffic. However, to do so, vehicle 406 would need to cut across the oncoming path of vehicle 404.

Similar to the LTAP scenario described in conjunction with FIG. 3, other vehicles (including vehicle 402) are obstructing the line of sight between vehicles 404 and 406. Accordingly, as alluded to above, neither the drivers of vehicles 404 and 406, nor collision detection systems in vehicles 404 or 406 which rely on imaging/proximity sensors, will be able to detect the movement/location of the other vehicle.

However, similar to the LTAP scenario described in conjunction with FIG. 3, vehicle 402 is within the line of sight of both vehicle 404 and 406. Therefore, imaging/proximity sensors equipped on vehicle 402 may detect (1) the movement/location of vehicle 404 as it heads north in the open lane, and (2) the movement/location of vehicle 406 as it proceeds through the gap in traffic. In some embodiments, the imaging/proximity sensors which detect the movement/location of vehicle 404 may be part of a Blind Spot Monitoring system, and the imaging/proximity sensors which detect the movement/location of vehicle 406 may be part of at least one of a Forward Collision Warning system and a Cross-Traffic Collision Warning System.

As alluded to above, an ECU in vehicle 402 may receive the information obtained by the imaging/proximity sensors of vehicle 402, and determine that vehicle 406 is about to cut across vehicle 404's northward path. Accordingly, the ECU in vehicle 402 may provide a warning signal to either or both of vehicles 404 and 406. For example, the ECU in vehicle 402 may flash the lights of vehicle 402 (e.g. the high beams, brake lights, hazard lights, or a combination of the three) to alert both drivers to the impending collision. In some embodiments, the ECU in vehicle 402 may activate the horn of vehicle 402 as a warning signal.

Figure 5:
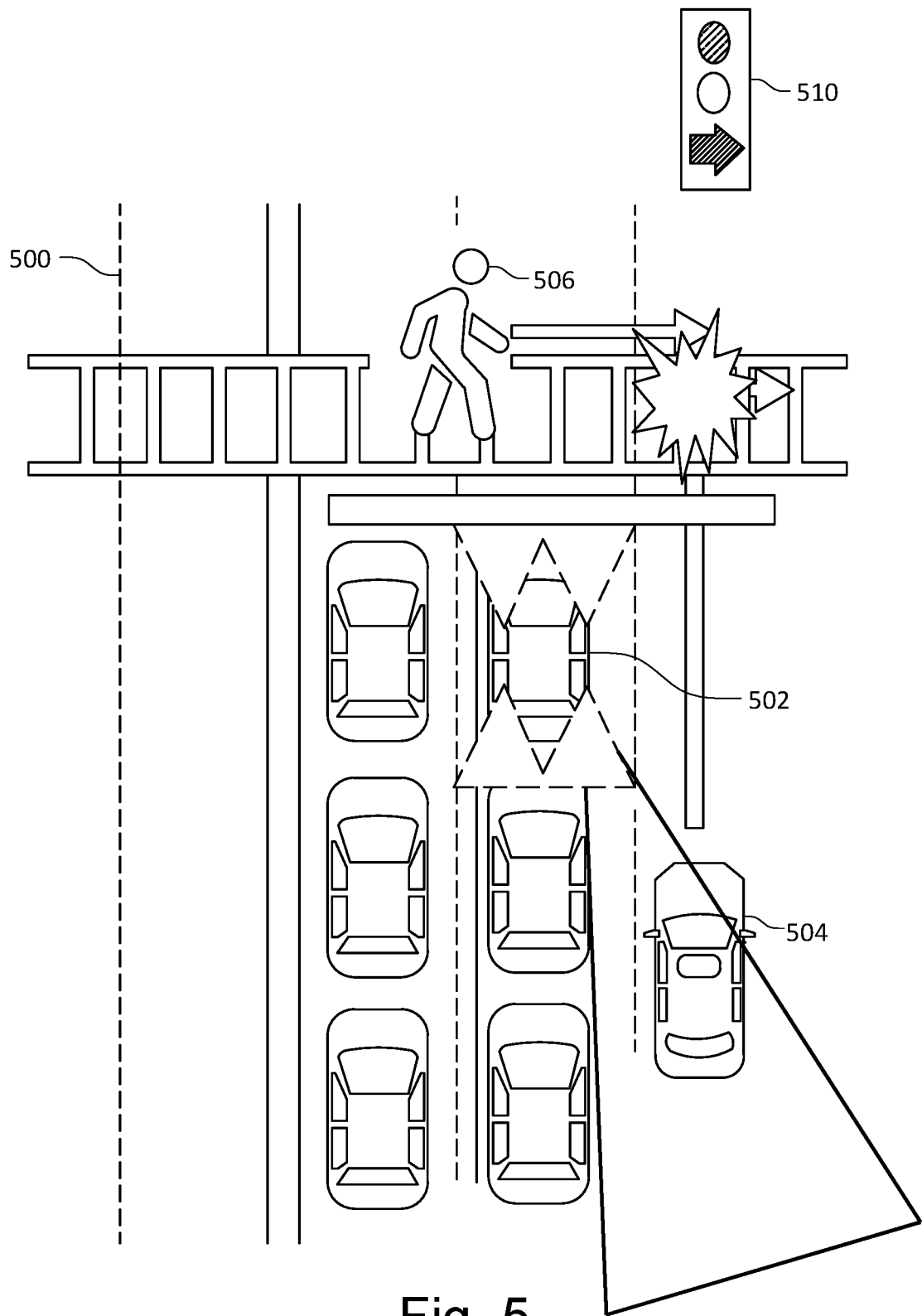
FIG. 5 depicts another example scenario in which embodiments of the disclosed technology may be implemented.

FIG. 5 depicts another example scenario (the Crosswalk scenario) in which embodiments of the disclosed technology may be implemented. In FIG. 5, vehicle 502 (i.e. the intermediary) is facing north, but stopped at intersection 500 because the phase of traffic light 510 is red for vehicles proceeding straight through intersection 500. Vehicle 504 is heading north in an open right-hand turn lane to the right of vehicle 502. The phase of traffic light 510 is green for vehicles making right hand-turns at intersection 500 (as vehicle 504 intends to do). Pedestrian 506 is proceeding east (illegally) across the crosswalk of intersection 500.

Similar to the scenarios described in conjunction with FIGS. 3 and 4, other vehicles (including vehicle 502) are obstructing the line of sight between vehicle 504 and pedestrian 506. Accordingly, neither the driver of vehicle 504, nor a collision detection system in vehicles 504 which relies on imaging/proximity sensors, will be able to detect the pedestrian. Similarly, the pedestrian may not be able to detect vehicle 504's approach.

However, just like in the scenarios described in conjunction with FIGS. 3 and 4, vehicle 502 is within the line of sight of both vehicle 504 and pedestrian 506. Therefore, imaging/proximity sensors equipped on vehicle 502 may detect (1) the movement/location of vehicle 504 as it heads north in the open lane, and (2) the movement/location of pedestrian 506 as pedestrian 506 proceeds across the road. In some embodiments, the imaging/proximity sensors which detect the movement/location of vehicle 504 may be part of a Blind Spot Monitoring system, and the imaging/proximity sensors which detect the movement/location of pedestrian 506 may be part of at least one of a Forward Collision Warning system and a Cross-Traffic Collision Warning system.

As alluded to above, an ECU in vehicle 502 may receive the information obtained by the imaging/proximity sensors of vehicle 502, and determine a probability that vehicle 504 and pedestrian 506 may collide with each other. Accordingly, the ECU in vehicle 502 may provide a warning to either or both of vehicle 504 and pedestrian 506. For example, the ECU in vehicle 502 may flash the high beams and/or high beams of vehicle 502 to alert the driver of vehicle 504 and pedestrian 506 to the impending collision. For example, the ECU in vehicle 502 may flash the lights of vehicle 502 (e.g. the high beams, brake lights, hazard lights, or a combination of the three) to alert the driver of vehicle 504 and pedestrian 506 to the impending collision. In some embodiments, the ECU in vehicle 502 may activate the horn of vehicle 502 as a warning signal.

Finally, it should be understood that in the illustrated example scenario, the pedestrian may be replaced by a non-motorized vehicle such as a bike, or scooter. Similarly, vehicle 504 may be a non-motorized vehicle.

Figure 6:
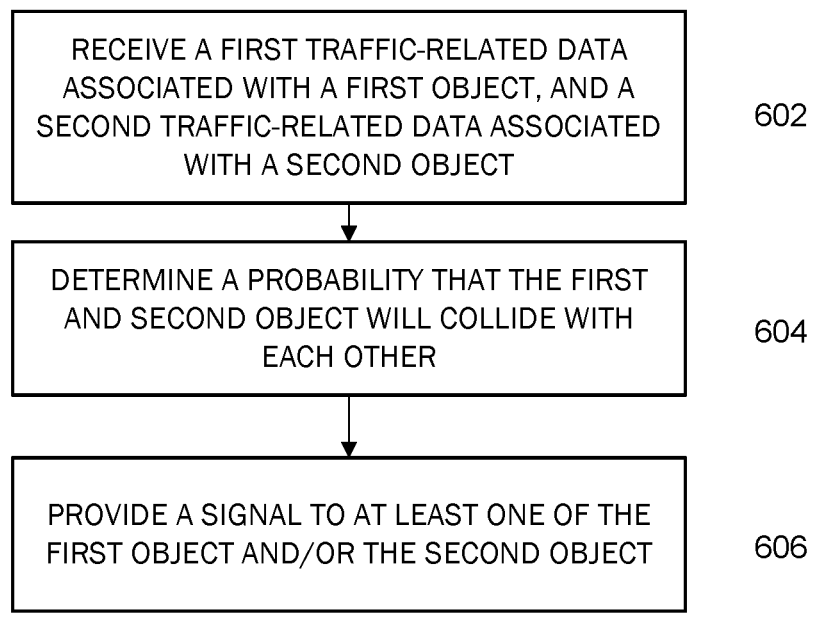
FIG. 6 is a flowchart illustrating example operations that can be performed to provide collaborative collision detection assistance.

FIG. 6 is a flowchart illustrating example operations that can be performed to provide collaborative collision detection assistance.

At operation 602, an ECU in an intermediary vehicle may receive a first traffic-related data associated with a first object and a second traffic-related data associated with a second object. In some embodiments, the line of sight between the first object and the second object may be obstructed.

It should be understood that an object is any material thing that may be touched/felt. For example, an object may be a vehicle, a pedestrian, an animal, a piece of debris on the road, etc. Moreover, a vehicle may be anything that is used for transporting people or goods. For example, a vehicle may be a motorized vehicle (e.g. car, truck, motorcycle, etc.), or a non-motorized vehicle (e.g. a bicycle, scooter, etc.).

As alluded to above, the ECU may receive the first and second traffic-related data from imaging sensors (e.g. cameras) and/or proximity sensors (e.g. sonar sensors, radar sensors, lidar sensors, etc.) equipped on the intermediary vehicle. In some embodiments, either the first or second traffic-related data may be received from a rear facing imaging/proximity sensor of a Blind Spot Monitoring system. Similarly, the other of the first traffic-related data and the second traffic-related data may be received from a front/side facing imaging/proximity sensor of a Forward Collision Warning system or a Cross-Traffic Collision Warning system.

The first and second traffic-related data may comprise any number of movement data and/or traffic-related characteristics associated with the first and second object. For example, the first traffic-related data may comprise the speed, acceleration, heading, and location of the first object. Similarly, the second data may comprise the speed, acceleration, heading, and location of the second object. Here, location may be with respect to a global reference frame (such as the center of the earth), or relative to the location of the intermediary vehicle. It should also be understood that these locations may be up to three dimensional. In some embodiments, the first and second traffic-related data may comprise other traffic-related characteristics such as object type (e.g. semi-truck, sportscar, pedestrian, deer, blown out tire, etc.). Where the first and second objects are a motor-vehicles, the first and second traffic-related data may comprise operation of a turning signal or operation of brake lights.

At operation 604, the ECU in the intermediary vehicle may determine a probability that the first and second object will collide with each other, based in part on the first and second traffic-related data received at operation 602. The ECU in the intermediary vehicle may use any number of inputs to make this determination. For example, in some embodiments the ECU may use the detected speed, heading, acceleration, and location of the first and second objects to predict trajectories for the first and second object. Accordingly, based on these predicted trajectories, the ECU may determine a probability that the first and second object will collide with each other. Where either or both of the first and second object are vehicles, the ECU may also use the operation of a turning signal, or brake lights to infer future movements.

In some embodiments, the ECU of the intermediary vehicle may consider other data/inputs in determining a probability of collision. For example, using the imaging sensors of the first vehicle, the ECU may detect that the traffic light at an intersection is green. Based on this information, the ECU may infer that e.g., the first object (which happens to be a car) will proceed through the intersection, into the detected turning path of the second object (which happens to be another car).

At operation 606, the ECU in the intermediary vehicle may provide a signal to at least one of the first and second object based on the probability of collision determined at operation 604. As alluded to above, the signal may comprise operation of the lights of the intermediary vehicle. For example, the ECU may flash the front high beams and/or hazard lights to alert an object which is in front of the intermediary vehicle. Similarly, the ECU may flash the brake/rear lights of the intermediary vehicle to alert an object which is behind the intermediary vehicle. In some embodiments, the signal may comprise the operation of LED lights where different colors may communicate different levels of caution (e.g. red for extreme caution, yellow for moderate caution). In certain embodiments, LED lights may be used to communicate a written message (e.g. "STOP"). In certain embodiments, the signal may comprise activation of the horn of the intermediary vehicle. In other embodiments, where either or both of the first and second object are vehicles, the signal may comprise V2X communication between the intermediary vehicle and the first and/or second object. For example, the ECU of the intermediary vehicle may use V2X communication to communicate with an emergency braking system in the first object (which happens to be a car), which may in turn automatically apply the brakes of the car to avoid/mitigate an imminent collision.

It should be understood that in certain embodiments, the provided signal may be different depending on the probability of collision determined at operation 604. For example, if the determined probability of collision is de minimis, no signal may be provided. By contrast, when the determined probability of collision is high, a signal may be provided which communicates a high level of urgency, such as flashing all of the lights of the intermediary vehicle, and/or activating the horn. In some embodiments, if only a low probability of collision is determined, the signal which is provided may communicate a lower level of urgency, such as a flickering of the high beams. As alluded to in the previous paragraph, LED lights may also be used to communicate varying degrees danger/collision probability.

Figure 7:
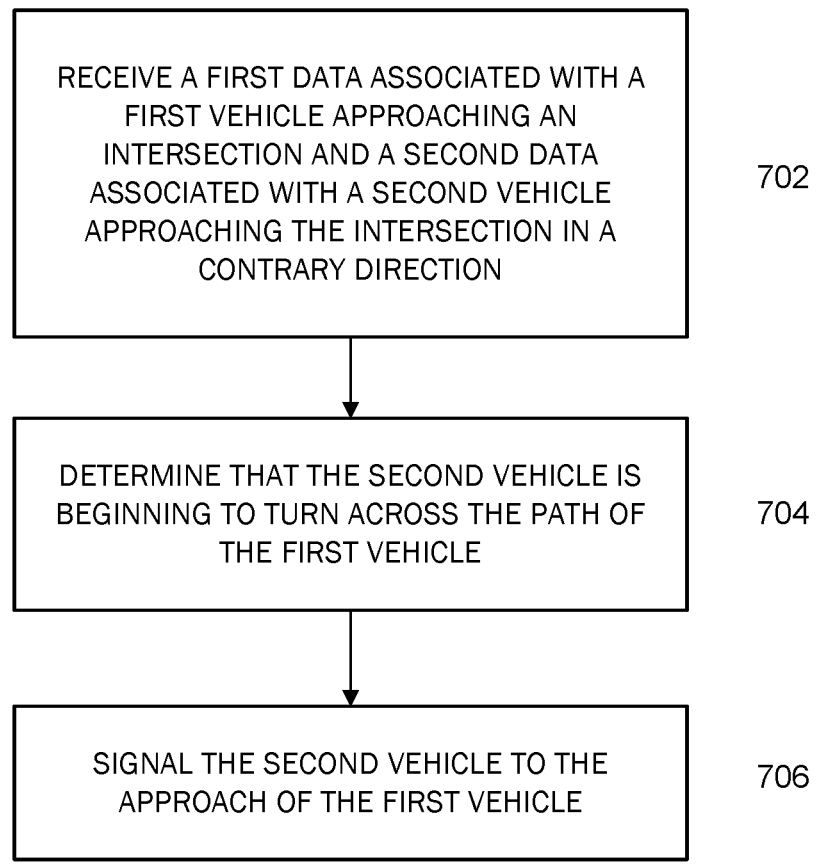
FIG. 7 is a flowchart illustrating example operations that can be performed to provide collaborative collision detection assistance at an intersection.

FIG. 7 is a flowchart illustrating example operations that can be performed to provide collaborative collision detection assistance at an intersection.

At operation 702, the ECU in an intermediary vehicle may receive a first traffic-related data associated with a first vehicle approaching an intersection and a second traffic-related data associated with a second vehicle approaching the intersection in a contrary direction to the first vehicle. In some embodiments, the line of sight between the first vehicle and the second vehicle may be obstructed.

As alluded to above, the ECU may receive the first and second traffic-related data from imaging sensors (e.g. cameras) and/or proximity sensors (e.g. sonar sensors, radar sensors, lidar sensors, etc.) equipped on the intermediary vehicle. In some embodiments, either the first or second traffic-related data may be received from a rear facing camera and/or radar sensor of a Blind Spot Monitoring system. Similarly, the other of the first traffic-related data and the second traffic-related data may be received from a front/side facing imaging/proximity sensor of a Forward Collision Warning system or a Cross-Traffic Collision Warning system.

The first and second traffic-related data may comprise any number of operating conditions and/or traffic-related characteristics associated with the first and second vehicle respectively. For example, the first traffic-related data may comprise the speed, acceleration, heading, and location of the first vehicle. Similarly, the second traffic-related data may comprise the speed, acceleration, heading, and location of the second vehicle. In some embodiments, the first and second traffic-related data may comprise other vehicle operating conditions/characteristics such as vehicle type (e.g. semi-truck vs bicycle), operation of a turning signal, operation of brake lights, etc.

At operation 704, the ECU in the intermediary vehicle may determine that the second vehicle is beginning to turn across the path of the first vehicle, based in part on the first and second traffic-related data received at operation 702. The ECU in the intermediary vehicle may use any number of inputs to make this determination. For example, in some embodiments the ECU may use the detected speed, heading, acceleration, and location of the first vehicle to predict a trajectory for the first vehicle which includes proceeding through the intersection at a certain speed. In some embodiments, the ECU may also use the phase of a traffic light (detected from imaging sensors of the first vehicle) to make this prediction. Similarly, the ECU of the intermediary vehicle may use the detected speed, acceleration, heading, and location of the second vehicle to predict a trajectory for the second vehicle which includes turning across the predicted trajectory/path of the first vehicle. In some embodiments, the ECU of the intermediary vehicle may use the phase of a traffic light, or the operation of a turn signal on the second vehicle to make this prediction. Accordingly, based on the predicted trajectories for the first and second vehicle, the ECU in the intermediary vehicle may determine that the second vehicle is beginning to turn across the path of the first vehicle.

At operation 706, the ECU in the intermediary vehicle may signal the second vehicle to the approach of the first vehicle, in response to the determination at operation 704. This signal may be the same/similar as described in conjunction with operation 606 of FIG. 6.

Figure 8:
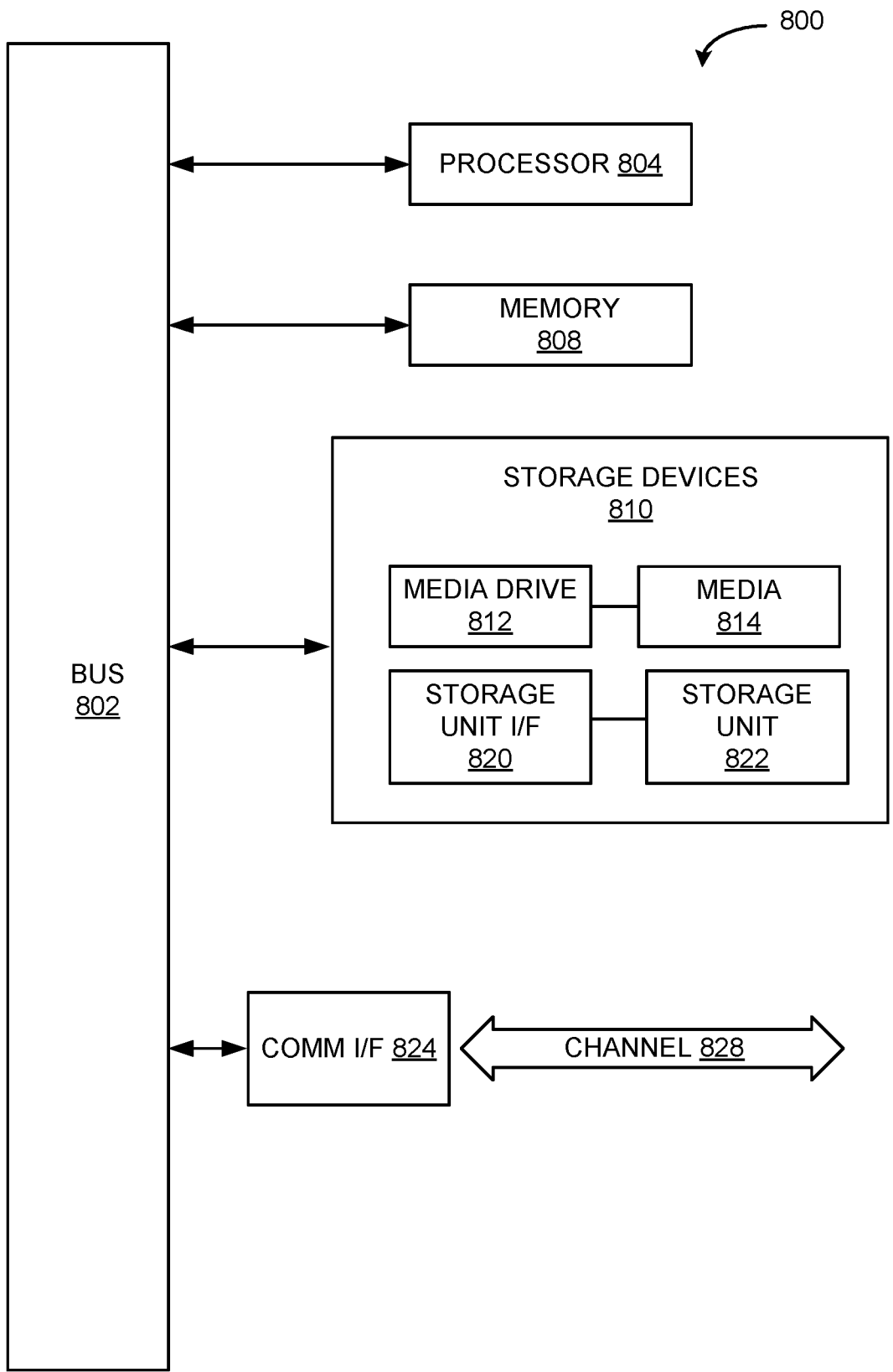
FIG. 8 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
   receiving, by an electronic control unit (ECU) in an intermediary vehicle, a first traffic-related data associated with a first object and a second traffic-related data associated with a second object, wherein the first and second objects are within a line of sight of the intermediary vehicle, but not within the line of sight of each other;
   based in part on the first and second traffic-related data, determining, by the ECU, a probability that the first and second objects will collide with each other; and
   based on the probability of collision, providing, by the ECU, a signal to at least one of the first and second objects.

2. The computer-implemented method of claim 1, wherein the first traffic-related data is received from one or more sensors of a Blind Spot Monitoring system in the intermediary vehicle.

3. The computer-implemented method of claim 2, wherein the second traffic-related data is received from one or more sensors of at least one of a Forward Collision Warning system and a Cross-Traffic Collision Warning system in the intermediary vehicle.

4. The computer-implemented method of claim 1, wherein: the first traffic-related data comprises speed, heading, acceleration, and location of the first object; and the second traffic-related data comprises speed, heading, acceleration, and location of the second object.

5. The computer-implemented method of claim 1, wherein determining the probability that the first and second objects will collide with each other comprises:
   predicting a trajectory for at least one of the first object and the second object; and
   based on the one or more predicted trajectories, determining the probability that the first and second objects will collide with each other.

6. The computer-implemented method of claim 1, wherein the signal comprises operation of at least one of a horn and lights on the intermediary vehicle.

7. The computer-implemented method of claim 1, wherein at least the first object is a vehicle.

8. The computer-implemented method of claim 7, wherein the signal comprises wireless communication between the intermediary vehicle and the first object.

9. A computer-implemented method comprising: receiving, by an ECU in an intermediary vehicle, a first traffic-related data associated with a first vehicle approaching an intersection and a second traffic-related data associated with a second vehicle approaching the intersection in a contrary direction to the first vehicle, wherein the first and the second vehicle are within a line of sight of the intermediary vehicle, but not within the line of sight of each other; based on the first and second traffic-related data, determining, by the ECU, that the second vehicle is beginning to turn across a path of the first vehicle; and in response to the determination, signaling, by the ECU, the second vehicle to the approach of the first vehicle.

10. The computer-implemented method of claim 9, wherein the first traffic-related data is received from one or more sensors of a Blind Spot Monitoring system on the intermediary vehicle.

11. The computer-implemented method of claim 10, wherein the second traffic-related data is received from one or more sensors of at least one of a Forward Collision Warning system and a Cross-Traffic Collision Warning system in the intermediary vehicle.

12. The computer-implemented method of claim 9, wherein:
   the first traffic-related data comprises one or more of the following: speed of the second vehicle; heading of the second vehicle; acceleration of the second vehicle; and location of the second vehicle; and
   the second traffic-related data comprises one or more of the following: speed of the second vehicle; heading of the second vehicle; acceleration of the second vehicle; location of the second vehicle; and visible operation of a turn signal on the second vehicle.

13. The computer-implemented method of claim 9, wherein signaling the second vehicle to the approach of the first vehicle comprises operation of at least one of a horn and lights on the intermediary vehicle.

14. The computer-implemented method of claim 9, wherein signaling the second vehicle to the approach of the first vehicle comprises wireless communication between the intermediary vehicle and the second vehicle.

15. A vehicle system comprising:
   a Blind Spot Monitoring System;
   at least one of a Forward Collision Warning system and a Cross-Traffic Collision Warning system; and
   an ECU including machine executable instructions in non-transitory memory to:
      receive, from the Blind Spot Monitoring System, a first traffic-related data associated with a first object;
      receive, from at least one of the Forward Collision Warning system and the Cross-Traffic Collision Warning system, a second traffic-related data associated with a second object;
      based in part on the first and second traffic-related data, determine a probability that the first and second objects will collide with each other; and
      based on the probability of collision, provide a signal to at least one of the first and second objects.

16. The vehicle system of claim 15, wherein: the first traffic-related data comprises speed, heading, acceleration, and location of the first object; and the second traffic-related data comprises speed, heading, acceleration, and location of the second object.

17. The vehicle system of claim 15, wherein determining the probability that the first and second objects will collide with each other comprises:
   predicting a trajectory for at least one of the first object and the second object; and
   based on the one or more predicted trajectories, determining the probability that the first and second objects will collide with each other.

18. The vehicle system of claim 15, wherein the signal comprises operation of at least one of a horn and lights on the intermediary vehicle.

19. The vehicle system of claim 15, wherein at least the first object is a vehicle.

20. The vehicle system of claim 19, wherein the signal comprises wireless communication between the intermediary vehicle and the first object.

* * * * *